United States Patent Office 3,499,860
Patented Mar. 10, 1970

3,499,860
CHLORINE-CONTAINING POLYMER
COMPOSITIONS
Richard J. Penneck, Colchester, England, assignor to Bakelite Xylonite Limited, a British corporation
No Drawing. Filed Oct. 20, 1965, Ser. No. 499,013
Claims priority, application Great Britain, Oct. 20, 1964, 42,683/64
Int. Cl. C08f 45/62
U.S. Cl. 260—23                              10 Claims

ABSTRACT OF THE DISCLOSURE

A color stabilized chlorine-containing polymer prepared from a chlorine-containing polymer and a plurality of organic metal salts and an acid additive selected from the group consisting of succinic acid, succinic anhydride, a mono-aliphatic ester of an aliphatic dicarboxylic acid, and an aromatic ester of an aliphatic dicarboxylic acid.

---

The present invention relates to chlorine-containing polymer compositions.

Chlorine-containing polymers tend to undergo undesirable changes in color when subjected to elevated temperatures particularly during molding and fabricating operations. Many compounds have been incorporated into the polymers to minimize this color change. Particularly useful compounds are organic salts of magnesium, calcium, strontium, barium, cadmium or zinc. However, when chlorine-containing polymers containing these salts are molded or fabricated they tend to leave deposits on the fabricating equipment such as calender or embossing rolls or die lips. These deposits can spoil the surface finish of the polymer and even cause complete breakdown in production due to the polymer sticking to the metal surfaces of the equipment. Furthermore, in certain cases the deposit can decompose the metal surface of the equipment which must be kept free from deposit in order to maintain satisfactory operation.

It is an object of the present invention to provide color stabilized chlorine-containing polymers in which the disadvantages hereinbefore described are either reduced or eliminated.

These and other objects are accomplished in the present invention which comprises a chlorine-containing polymer, an organic metal salt or salts having color stabilizing properties for chlorine-containing polymers in which the metal component of each salt is a Group II metal, as hereinafter defined, such as magnesium, calcium, strontium, barium, cadmium or zinc and succinic acid or its anhydride or a mono aliphatic or aromatic ester of a saturated or unsaturated aliphatic dicarboxylic acid containing at least 4 and not more than 10 carbon atoms.

The term "chlorine-containing polymer" includes any polymer containing at least 50 percent by number of polymerized units which are formed from chlorine-containing unsaturated olefinic monomers. Examples of these monomers are vinyl chloride vinylidene chloride and cis or trans dichloroethylene. They can be polymerized to form copolymers with monomers such as vinyl acetate, vinyl propionate, and fumaric and maleic esters. Typical chlorine-containing polymers are polyvinyl chloride, post chlorinated polyvinyl chloride graft or block copolymers in which polyvinyl chloride is the main constituent, and copolymers formed from vinyl chloride and vinylidene chloride containing about 4 percent by weight of vinylidene chloride, copolymers formed from vinyl chloride and vinyl acetate containing about 10 percent by weight of vinyl acetate, copolymers from vinyl chloride and dioctyl fumarate containing about 15 percent by weight of dioctyl fumarate.

Any organic metal salts having color stabilizing properties for chlorine-containing polymers in which the metal component of a salt is a Group II metal of the Periodic Chart of the Elements as defined in the frontispiece of "The Merck Index," seventh edition, 1960, having an atomic weight of from 10 to 138 are suitable for use in the compositions of the present invention. Such Group II metals can be further classified as Group IIa metals such as magnesium, calcium, strontium and barium and Group IIb metals such as zinc and cadmium. Typical salts can be prepared from organic acids having 4 to 18 carbon atoms. Such acids can be saturated or unsaturated aromatic, aliphatic, or alicyclic mono or dicarboxylic acids which can be substituted by hydroxyl groups, halogens, sulphur or oxygen. Some examples of these acids are maleic acid and acid/esters, fumaric acid and acid esters, itaconic acid and acid/esters, benzoic acid, caproic acid, 2 ethylhexanoic acid, p-tertiary butyl benzoic acid, salicylic acid, acetyl salicylic acid, p-chlorobenzoic acid, 2,4-dichloro benzoic acid, phthalic acid and acid esters, 3,6-endomethylene - 1,2,3,6 - tetrahydrophthalic acid and acid esters, chlorendic acid and acid esters, thiodipropionic acid, lauric acid, stearic acid, 12-hydroxy stearic acid, and epoxy stearic acid. The salts can also be formed from a phenol or substituted phenol, e.g. phenol p-chlorophenol and p-octyl phenol. Preferably two, three or more of such salts comprise the compound of the present invention.

The proportion by weight of the metal salts in relation to the weight of chlorine-containing polymer in the composition can vary within wide limits and depends upon the required degree of protection against color change. Typical proportions are in the range 0.5 to 10 percent.

Particularly suitable mono aliphatic esters of saturated or unsaturated dicarboxylic acids containing at least 4 and not more than 10 carbon atoms are esters in which the esterified aliphatic substituents contain at least 1 and not more than 12 carbon atoms and preferably at least 1 and not more than 8 carbon atoms. The resultant ester thus contains from 5 up to 22 carbon atoms. Some examples are the mono-esters of maleic, succinic, glutaric, adipic, pimelic, suberic, azelaic and sebacic acid and in particular the methyl, ethyl, hexyl, n-heptyl and 2-ethylhexyl, acid succinates, the methyl, and ethyl acid maleates, and the methyl acid glutarates and adipates. Examples of the aromatic esters of these acids are benzyl acid succinate or maleate.

A particularly suitable proportion by weight of succinic acid or its anhydride or mono aliphatic or aromatic ester of a saturated or unsaturated aliphatic dicarboxylic acid in relation to the total weight of chlorine-containing polymer in the composition is in the range 0.05 to 3 percent and the preferred weight is in the range 0.1 to 1 percent.

The chlorine-containing polymer compositions can contain plasticizers, lubricants colorants, antioxidants, ultra violet light absorbing substances, and other known auxiliary stabilizers such as for example epoxy compounds.

The present invention is further illustrated in the following examples.

EXAMPLE 1

100 grams of polyvinyl chloride were mixed with 2 grams of cadmium 2-ethylhexyl maleate, 1 gram of barium 2-ethyl-hexyl maleate, 0.4 gram of zinc 2-ethylhexyl maleate, 2 grams of an epoxy tall oil ester as stablizer, 0.25 gram of wax lubricant and 0.5 gram of succinic acid. The formulation gelled and was fluxed on a twin roll mill at 175–180° C. No plate out was produced, even after 30 minutes milling.

By way of comparison another mix containing the ingredients already listed with the exception of succinic acid was milled in exactly the same manner. Moderate to heavy plate out was encountered during the first 20 minutes of milling.

EXAMPLE 2

Similar results were obtained when succinic anhydride was used in place of the succinic acid of Example 1.

EXAMPLE 3

A similar experiment was carried out using the same basic formulation as in Example 1, and using 0.5 gram of benzyl hydrogen succinate in place of succinic acid.

Immediately after gelling, only very light plate out was produced and after 5 minutes, none at all.

EXAMPLE 4

100 grams of a 90 percent vinyl chloride-10 percent vinyl acetate copolymer were mixed with 2 grams of calcium octyl maleate, 1 gram of zinc octyl maleate, .75 gram of magnesium octyl maleate, 2 grams of 2:2 dimethyl-1,3-propane diol, 4 grams of epoxidized soya bean oil, 2 grams of wax lubricant, 0.25 gram of dilauryl thio-dipropionate was antioxidant and 0.5 gram of n-heptyl acid succinate. This mix was fluxed on a twin roll mill at 170–175° C. No plate out was encountered even after 30 minutes milling at this temperature.

By way of comparison another mix containing the ingredients already listed with the exception of the n-heptyl acid succinate was milled in exactly the same manner and light to medium plate out was encountered after 5 minutes of milling.

EXAMPLE 5

A similar experiment was carried out using the same basic formulation as in Example 4 but using methyl acid succinate (0.5 gram) in place of succinic acid. No plate out was encountered.

EXAMPLE 6

A similar experiment was carried out using the same basic formulation as in Example 4, but using ethyl acid succinate (0.5 gram) in place of succinic acid. No plate out was encountered.

EXAMPLE 7

A similar experiment was carried out using the same basic formulation as in Example 4, but using butyl acid succinate (0.5 gram) in place of succinic acid. No plate out was encountered.

EXAMPLE 8

A similar experiment was carried out using the same basic formulation as in Example 4, but using methyl acid meleate (0.5 gram) in place of succinic acid. No plate out was encountered.

EXAMPLE 9

A similar experiment was carried out using the same basic formulation as in Example 4, but using ethyl acid maleate (0.5 gram) in place of succinic acid. No plate out was encountered.

EXAMPLE 10

A similar experiment was carried out using the same basic formulation as in Example 9, but using 0.5 gram of benzyl acid maleate in place of succinic acid. No plate out was encountered.

EXAMPLE 11

80 grams of vinyl chloride-10 percent vinyl acetate copolymer and 20 grams of a vinyl chloride-15 percent dioctyl fumarate copolymer were mixed with 1.0 gram of wax lubricant and a stabilizer composition comprising 0.75 gram of calcium salicylate, 0.75 gram of magnesium benzoate, 0.75 gram of zinc p-chlorobenzoate, 2.0 grams of glycerol, 0.50 gram of dilauryl thio-dipropionate, 4.0 grams of epoxidized linseed oil and 0.50 gram of succinic acid. The formulation was milled at 170–175° C. and exhibited not plate out even after 30 minutes milling.

By way of comparison a control formulation containing all the ingredients above except the succinic acid exhibited severe plate out after only 5 minutes of milling.

EXAMPLE 12

80 grams of a vinyl chloride-10 percent vinyl acetate copolymer and 20 grams of a vinyl chloride-15 percent dioctyl fumarate copolymer were mixed with 2.0 grams of wax lubricant, 0.5 gram of succinic acid and a stabilizing mixture comprising 1.0 gram of calcium salicylate, 0.75 gram of magnesium thio-dipropionate, 0.75 gram of zinc 2-ethylhexyl maleate, 1.5 grams of 2,2-dimethyl-1,3-propane diol, 0.5 gram dilsuryl thio-dipropionate and 4.0 grams of epoxidized linseed oil. The formulation was milled at 170–175° C. as before and showed no signs of plate out after 20 minutes milling.

By way of comparison a control formulation containing all the ingredients above except the succinic acid exhibited moderate-heavy plate out after 5 minutes and this became more severe after 10 minutes.

EXAMPLE 13

100 grams of a vinyl chloride-10 percent vinyl acetate copolymer were mixed with 2.0 grams of calcium n-heptyl maleate, 1.0 gram of zinc 2-ethylhexyl maleate, 0.75 gram of magnesium octyl maleate, 1.5 grams of 2,2′-dimethyl-1,3-propane-diol, 4.0 grams of epoxidized soya bean oil, 1.5 grams of wax lubricant, 0.5 gram of dilauryl thio-dipropionate and 0.5 gram of methyl acid glutarate. The mix was fluxed on a twin roll mill at 170–175° C. No plate out was encountered after 15 minutes milling at this temperature.

By way of comparison, a control mix containing all the ingredients above except the methyl acid glutarate was milled in exactly the same manner and light-medium plate out was encountered after 5 minutes.

EXAMPLE 14

A similar experiment was carried out using the same basic formulation as in Example 13 but using methyl acid adipate (0.5 gram) in place of methyl acid glutarate. No plate out was encountered after 15 minutes.

What is claimed is:

1. A chlorine-containing polymer composition comprising a chlorine-containing polymer, formed from at least 50 percent by number of polymerized units which are formed from chlorine-containing unsaturated olefinic monomers, a plurality of organic metal salts prepared from organic acids having from 4 to 18 carbon atoms selected from the group consisting of aromatic, straight chained aliphatic, or alicyclic mono or dicarboxylic acids having color stabilizing properties for chlorine-containing polymers in which the metal component of each salt is a Group II metal of the Periodic Chart of the Elements having an atomic weight from 10 to 138 and an acid additive selected from the group consisting of succinic acid, succinic anhydride, a monoaliphatic ester having from 5 to 22 carbon atoms of an aliphatic dicarboxylic acid which has from 4 to 10 carbon atoms and an aromatic ester having from 5 to 22 carbon atoms of an aliphatic dicarboxylic acid which has from 4 to 10 carbon atoms wherein the proportions by weight of metal salt and additive in relation to the weight of chlorine containing polymer are in the range of 0.5 to 10 percent and 0.1 to 1.0 percent respectively.

2. A chlorine-containing polymer composition as claimed in claim 1 wherein the acid additive aliphatic dicarboxylic acid is glutaric acid.

3. A chlorine-containing polymer composition as claimed in claim 1 wherein the acid additive aliphatic dicarboxylic acid is adipic acid.

4. A chlorine-containing polymer composition as claimed in claim 1 wherein the acid additive aliphatic dicarboxylic acid is maleic acid.

5. A chlorine-containing polymer composition as claimed in claim 1 having an organic cadmium salt and an organic barium salt.

6. A chlorine-containing polymer composition as claimed in claim 1 having an organic calcium salt, an organic zinc salt and an organic magnesium salt.

7. A chlorine-containing polymer composition comprising a chlorine-containing polymer, formed from at least 50 percent by number of polymerized units which are formed from chlorine-containing unsaturated olefinic monomers, a plurality of organic metal salts prepared from organic acids having from 4 to 18 carbon atoms selected from the group consisting of aromatic, straight chained aliphatic, or alicyclic mono or dicarboxylic acids having color stabilizing properties for chlorine-containing polymers in which the metal component of each salt is a Group II metal of the Periodic Chart of the Elements having an atomic weight from 10 to 138 and succinic acid wherein the proportions by weight of metal salt and succinic acid in relation to the weight of chlorine containing polymer are in the range of 0.5 to 10 percent and 0.1 and 1.0 percent respectively.

8. A chlorine-containing polymer composition comprising a chlorine-containing polymer, formed from at least 50 percent by number of polymerized units which are formed from chlorine-containing unsaturated olefinic monomers, a plurality of metal salts prepared from organic acids having from 4 to 18 carbon atoms selected from the group consisting of aromatic, straight chained aliphatic, or alicyclic mono or dicarboxylic acids having color stabilizing properties for chlorine-containing polymers in which the metal component of each salt is a Group II metal of the Periodic Chart of the Elements having an atomic weight from 10 to 138 and succinic anhydride wherein the proportions by weight of metal salt and succinic anhydride in relation to the weight of chlorine containing polymer are in the range of 0.5 to 10 percent and 0.1 to 1.0 percent respectively.

9. A chlorine-containing polymer composition comprising a chlorine-containing polymer, formed from at least 50 percent by number of polymerized units which are formed from chlorine-containing unsaturated olefinic monomers, a plurality of organic metal salts prepared from organic acids having from 4 to 18 carbon atoms selected from the group consisting of aromatic, straight chained aliphatic, or alicyclic mono or dicarboxylic acids having color stabilizing properties for chlorine-containing polymers in which the metal component of each salt is a Group II metal of the Periodic Chart of the Elements having an atomic weight from 10 to 138 and a mono aliphatic ester having from 5 to 22 carbon atoms of an aliphatic dicarboxylic acid which has from 4 to 10 carbon atoms wherein the proportions by weight of metal salt and aliphatic ester in relation to the weight of chlorine containing polymer are in the range of 0.5 to 10 percent and 0.1 and 1.0 percent respectively.

10. A chlorine-containing polymer composition comprising a chlorine-containing polymer, formed from at least 50 percent by number of polymerized units which are formed from chlorine-containing unsaturated olefinic monomers, a plurality of metal salts prepared from organic acids having from 4 to 18 carbon atoms selected from the group consisting of aromatic, straight chained aliphatic, or alicyclic mono or dicarboxylic acids having color stabilizing properties for chlorine-containing polymers in which the metal component of each salt is a Group II metal of the Periodic Chart of the Elements having an atomic weight from 10 to 138 and an aromatic ester having from 5 to 22 carbon atoms of an aliphatic dicarboxylic acid which has from 4 to 10 carbon atoms wherein the proportions by weight of metal salt and aromatic ester in relation to the weight of chlorine containing polymer are in the range of 0.5 to 10 percent and 0.1 to 1.0 percent respectively.

References Cited

UNITED STATES PATENTS

| | | | |
|---|---|---|---|
| 3,351,576 | 11/1967 | Oakes et al. | 260—23 |
| 3,243,394 | 3/1966 | Dietz | 260—23 |
| 3,274,151 | 9/1966 | Settele | 260—45.75 |

DONALD E. CZAJA, Primary Examiner

D. J. BARRACK, Assistant Examiner

U.S. Cl. X.R.

260—45.75, 45.85, 86.3, 87.1